(12) United States Patent
Brown et al.

(10) Patent No.: US 7,236,430 B2
(45) Date of Patent: Jun. 26, 2007

(54) APPARATUS, METHOD AND SYSTEM FOR TEACHING ELAPSED TIME

(75) Inventors: Bruce B. Brown, Baltimore, MD (US); Pui Yan Chan, Causeway Bay (HK)

(73) Assignee: World Class Learning Materials, Inc., Baltimore, MD (US)

( * ) Notice: Subject to any disclaimer, the term of this patent is extended or adjusted under 35 U.S.C. 154(b) by 0 days.

(21) Appl. No.: 11/489,108

(22) Filed: Jul. 19, 2006

(65) Prior Publication Data
US 2006/0257837 A1 Nov. 16, 2006

Related U.S. Application Data

(63) Continuation of application No. 10/845,432, filed on May 13, 2004, now Pat. No. 7,121,833.

(51) Int. Cl.
G04B 19/06 (2006.01)
G09B 19/12 (2006.01)

(52) U.S. Cl. .......................... 368/80; 434/304
(58) Field of Classification Search .................. 368/80, 368/96, 106; 434/304; 235/111–113, 1 C, 235/103–104, 103.5 R, 103.5 E
See application file for complete search history.

(56) References Cited

U.S. PATENT DOCUMENTS

| | | | |
|---|---|---|---|
| 2,837,838 A | 6/1958 | Lewis | |
| 2,997,794 A | 8/1961 | Burr | |
| 3,022,582 A * | 2/1962 | Pitt | 434/304 |
| 3,203,115 A | 8/1965 | Friday | |
| 3,364,599 A | 1/1968 | Polsky | |
| 4,015,346 A | 4/1977 | Ogasawara | |
| 4,102,060 A | 7/1978 | Berry | |
| 5,505,624 A | 4/1996 | Novosel | |
| 5,851,118 A | 12/1998 | Woldenberg et al. | |
| 5,863,205 A | 1/1999 | Martens | |
| 6,071,124 A | 6/2000 | Ang et al. | |
| 6,406,301 B2 * | 6/2002 | Richards | 434/304 |
| 6,428,201 B1 | 8/2002 | Shibuya et al. | |
| 7,121,833 B2 * | 10/2006 | Brown et al. | 434/304 |

* cited by examiner

*Primary Examiner*—Vit Miska
*Assistant Examiner*—Sean Kayes
(74) *Attorney, Agent, or Firm*—Thompson Hine LLP

(57) ABSTRACT

A teaching clock for teaching the concept of elapsed time includes a clock face having a minute hand and an hour hand pivotally mounted to the clock face and an elapsed time indicator having an hour hand and a minute hand that move synchronously with the movement of the clock hands. The hour hand is connected to the minute hand such that pivotal movement of the minute hand about the clock face causes the hour hand to pivot synchronously therewith to designate a progression of hours of the day. The minute hand and hour hand are selectively positionable to display a time of day. The elapsed time display may include a releasable connection connected to the minute hand such that the elapsed time display resets to an initial or zero position upon release of the releasable connection whereby an elapsed time is shown by the elapsed time display between any two selected times of day shown by the minute hand and hour hand on the clock face.

11 Claims, 8 Drawing Sheets

APPARATUS, METHOD AND SYSTEM FOR TEACHING ELAPSED TIME

This application is a continuation of U.S. Ser. No. 10/845,432 filed on May 13, 2004 now U.S. Pat. No. 7,121,833, the entire contents of which are incorporated herein by reference.

BACKGROUND

The present application relates to teaching methods and associated apparatus and systems and, more particularly, to methods, apparatus and systems for teaching the concept of elapsed time.

The concept of elapsed time, that is, the number of hours and minutes between two times of day, is often difficult to teach to children. This concept may be especially difficult when a child uses an analog clock. In order to teach this concept, teachers often employ teaching aids in the form of teaching clocks. Such teaching clocks have the hour hand, minute hand and face with numbered hours of a conventional analog clock, but not the clockwork mechanism to move the hands. Typically, a teacher positions the hands of such a teaching clock at a first selected time of day, which is noted by students. The teacher then positions the hands of the teaching clock at a second selected time of day and the students are asked to determine the time interval between the first and second times.

An example of such a system is disclosed in U.S. Pat. No. 5,863,205. While that teaching clock has interconnected minute and hour hands that are positionable, as well as a corresponding digital display of the same time of day indicated by the hands, it lacks a mechanism for displaying the time interval between two selected times of day.

Accordingly, there is a need for an apparatus, method and system for teaching students the concept of elapsed time and a method for determining the time that has elapsed between two times of day. There is also a need for an apparatus, method and system for teaching students how to calculate ending time—the time of day after a given elapsed time from a given starting time, and beginning time—the time of day from which a given elapsed time results in a given ending time.

SUMMARY

In one aspect, the disclosed apparatus for teaching elapsed time may include a clock face on which are mounted a minute hand and an hour hand interconnected by a clock gear train such that pivotal movement of the minute hand about the clock face causes the hour hand to pivot so that the hands progress through the hours of the day indicated on the clock face. Consequently, the minute and hour hands are positionable to display a selected time of day.

The teaching clock may also include an elapsed time display, which in one embodiment includes smaller hour and minute hands, each on its own dial marked with hours and minutes, respectively. The elapsed time display is releasably connected to the clock gear train such that the elapsed time display resets to an initial or zero position (for example, such that the hour and minute hands point to "12" and "60" on their respective faces) upon release of the releasable connection. In order to show an elapsed time between any two selected times of day shown on the clock face, the clock hands first are set to a selected start or beginning time. The releasable connection may be released, thereby zeroing the elapsed time display, such that the elapsed time display resets to an initial or zero position while the minute hand and the hour hand show the start time. The minute hand and hour hand may then be adjusted to show a second, later time of day. As the minute and hour hands are pivoted to the second selected time of day, the minute and hour hands of the elapsed time display pivot to show the elapsed time or time interval between the start time and the second, later time of day.

In another aspect, the disclosed system for teaching elapsed time may include the teacher clock described above and a student clock. The student clock may include a clock face having a minute hand and an hour hand pivotally mounted to the clock face. The hour hand may be connected to the minute hand by a gear train such that pivotal movement of the minute hand about the clock face causes the hour hand to pivot synchronously therewith to designate a progression of hours such that the minute hand and the hour hand are selectively positionable to display a time of day. The student clock may further include an elapsed time display consisting of independently adjustable hour and minute hands pivotally mounted on separate faces marked with hours and minutes, respectively. The elapsed time display of the student clock may also be independent of the clock minute and hour hands.

Thus, the hands of the teacher clock may be adjusted to show a first selected time of day, the elapsed time display may be reset to a initial position and a student may be instructed to set the hands of the student clock to show a second, later time of day. The student may then determine the elapsed time and display it on the elapsed time display of the student clock by positioning the hands of the elapsed time display. A verification of elapsed time may then be obtained by adjusting the minute hand and hour hand of the teacher clock to correspond to the second selected time of day. This adjustment may automatically move the hands of the elapsed time display to show the correct elapsed time. Ending time may be taught by positioning the hands of the teacher clock at a beginning time, zeroing the elapsed time display and asking the student to determine (or show on the student clock) the ending time for a given elapsed time. The hands of the teacher clock may then be moved clockwise until the hands of the elapsed time display show the given elapsed time. The ending time may then be indicated by hands of the teacher clock. Similarly, beginning time is taught by positioning the hands of the teacher clock at a predetermined ending time of day, zeroing the elapsed time display and asking the student to determine (or show on the student clock) the beginning time for a given elapsed time. The hands of the teacher clock may then be moved counterclockwise until the hands of the elapsed time display show the given elapsed time (measured counterclockwise).

Other aspects of the disclosed apparatus, method and system for teaching elapsed time will become apparent from the following description, the accompanying drawings and the appended claims.

BRIEF DESCRIPTION OF THE DRAWINGS

FIG. 2 is an exploded, perspective view of the teacher clock of FIG. 1;

DETAILED DESCRIPTION

Figure 1:
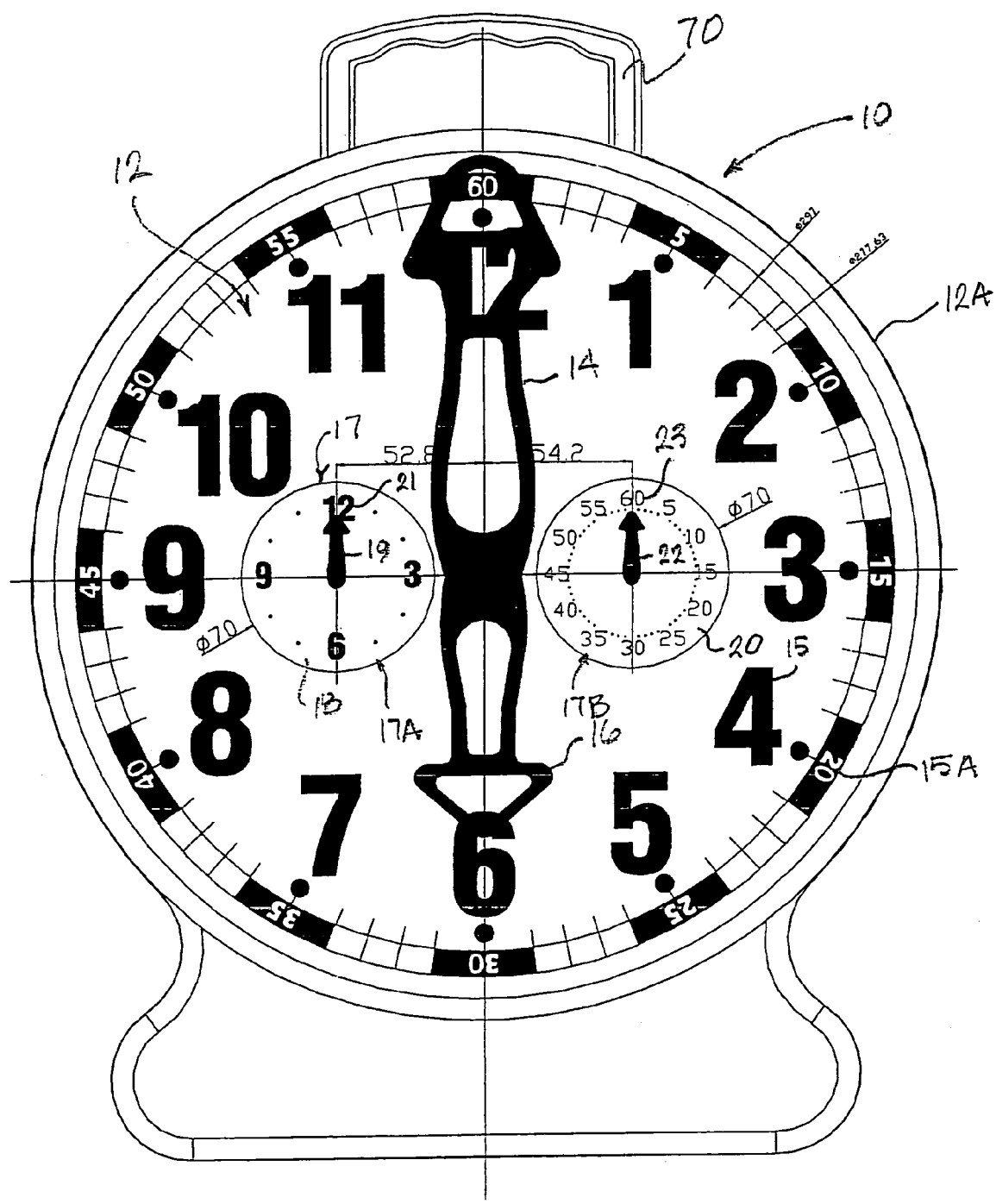
FIG. 1 is a front elevational view of the face a teacher clock of the present invention.
Figure 1:
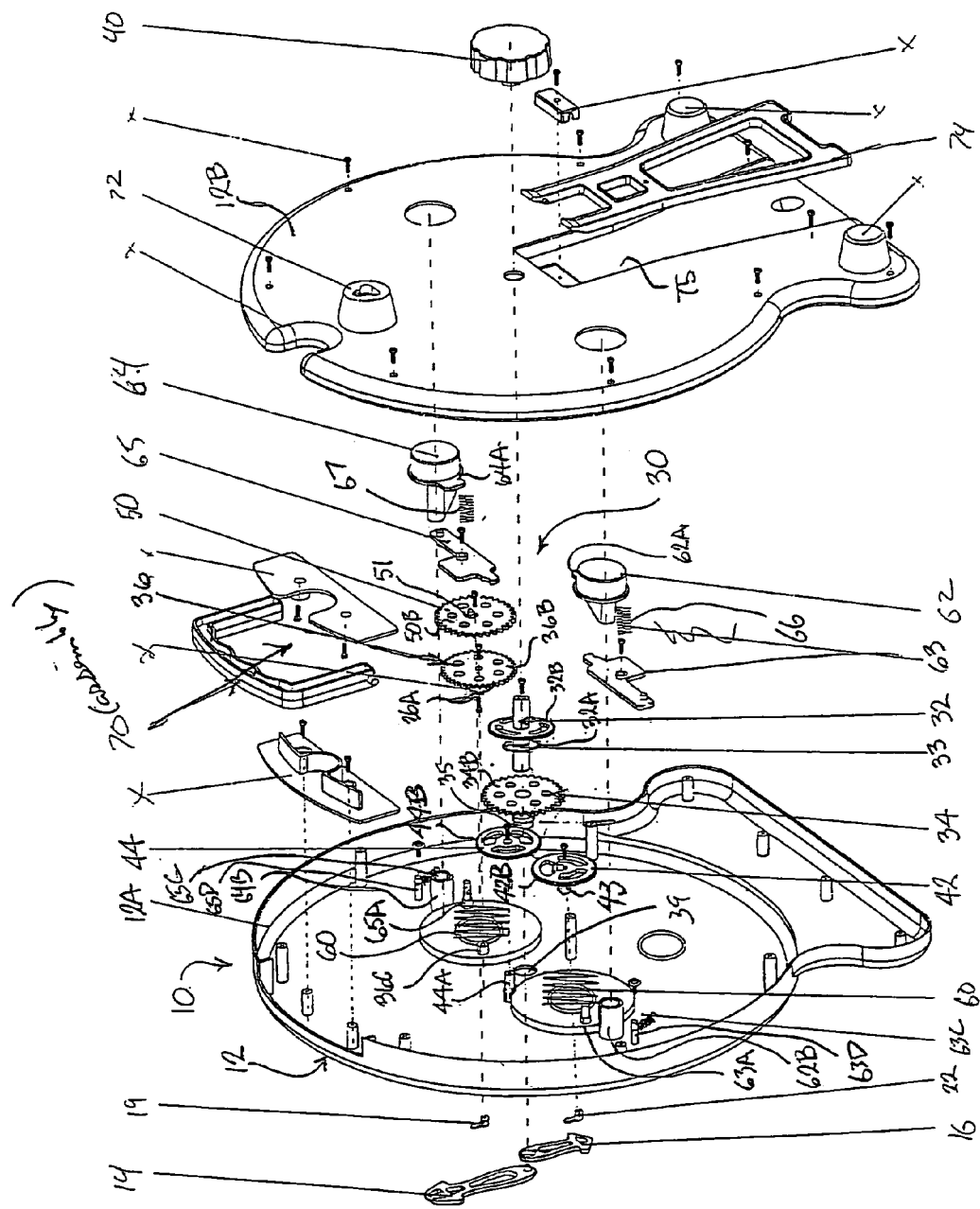

One aspect of the disclosed teacher clock, generally designated 10, may include a clock face 12 having an outer shell 12A with a minute hand 14 and an hour hand 16 pivotally mounted thereto. The hour hand 16 may be connected to the minute hand 14 by a gear train 30 (see FIG. 2) such that a manual movement of the minute hand 14 about the clock face 12 causes synchronous and corresponding movement of the hour hand 16 to designate a time of day.

Numerical indicia representing the hour component 15 and minute component 15A of the time of day may be displayed around the periphery of the clock face 12. Specifically, the numbers 1 through 12 may be positioned and equally spaced around the periphery of the clock face 12 to indicate the hour component 15 and the numbers 5, 10, 15, 20, 25, 30, 35 40, 45, 50, 55 and 60 may also be positioned around the periphery of the clock face 12 to indicate the minute component 15A.

The clock face 12 may also include an elapsed time display 17 that includes an hour indicating face 17A with an analog hour indicator 18 and a minute indicating face 17B with an analog minute indicator 20. The analog hour indicator 18 may include an elapsed time hour hand 19 pivotally mounted thereto and hour-indicating indicia 21 disposed about the periphery of the analog hour indicator. Similarly, the analog minute indicator 20 may include an elapsed time minute hand 22 pivotally mounted thereto and minute indicating indicia 23 disposed about the periphery of the analog minute indicator. As will be described with reference to FIG. 2, the analog hour indicator 18 and analog minute indicator 20 may be releaseably connected to the minute hand 14 and hour hand 16 such that movement of the minute hand 14 about the clock face 12, and corresponding movement of the hour hand 16, moves the elapsed time minute hand 22 and the elapsed time hour hand 19 a corresponding amount. Those skilled in the art will appreciate that the elapsed time display 17 may be a digital elapsed time display.

As shown in FIG. 2, the teacher clock 10 may include a gear train 30 enclosed within the outer shell 12A and inner shell 12B of face 12. The gear train 30 may include six spur gear elements that interconnect the minute hand 14, the hour hand 16, the elapsed time minute hand 22 and the elapsed time hour hand 19. The gear train 30 may include a first gear element 32, second gear element 34, third gear element 36, fourth gear element 42, fifth gear element 44 and sixth gear element 50.

The first, second and third gear elements 32, 34, 36 may connect the minute hand 14 to the hour hand 16 for synchronous movement. The first gear element 32 may include a shaft 33, a small diameter spur gear 32A and a large diameter spur gear 32B. An adjustment knob 40 may be attached to an inner end of shaft 33 of first gear element 32. The second gear element 34 may include a hollow shaft 35 and one large diameter spur gear 34B. The third gear element 36 may include a small diameter spur gear 36A and a large diameter spur gear 36B and may be rotatably mounted on post 36C. Spur gears 32A and 36A may have the same pitch diameters. Spur gears 34B and 36B may have the same pitch diameters, which may be twelve times greater than the pitch diameters of spur gears 32A and 36A. For example, if spur gears 32A and 36A each had a pitch diameter of 5 mm, spur gears 34B and 36B each would have a pitch diameter of 60 mm.

The shaft 33 of the first gear element 32 may be coaxially received within the hollow shaft 35 of the second gear element 34 such that both shafts 33, 35 extend through an opening 39 through the clock face 12. The minute hand 14 may be connected to the outer end of shaft 33 of the first gear element 32 that protrudes through opening 39 and the hour hand 16 may be connected to an outer end of the hollow shaft 35 of the second gear element 34 that protrudes through an opening 39 in the outer shell 12A. The first gear element 32 may be connected to the second gear element 34 by the third gear element 36. Spur gear 32A may be connected to spur gear 36B and spur gear 36A may be connected to spur gear 34B. Therefore, one full (i.e., 360°) rotation of the first gear element 32 may correspond to one-twelfth of a rotation (i.e., 30°) of the third gear element 36, which may correspond to one-twelfth of a rotation (i.e., 30°) of the second gear element 34, such that one full rotation of the minute hand 14 about the clock face 12 may correspond to one-twelfth of a rotation of the hour hand 16 about the clock face 12.

The fourth and fifth gear elements 42, 44 may be responsible for synchronously connecting the elapsed time minute hand 22 of the analog minute indicator 20 to the movement of the minute hand 14 and hour hand 16. The fourth gear element 42 may include a shaft 43 and a large diameter spur gear 42B. The fifth gear element 44 may be rotatably mounted on post 44A and may include a large diameter spur gear 44B. Spur gears 42B and 44B may each have the same pitch diameter as spur gear 32B.

The elapsed time minute hand 22 may rotate about the analog minute indicator 20 (see FIG. 1) synchronously with the minute hand 14. The elapsed time minute hand 22 may be connected to the shaft 43 of the fourth gear element 42. Rotation of the first gear element 32 (which may be accomplished by manual rotation of knob 40 or manual rotation of minute hand 14) may be translated into corresponding rotation of the fourth gear element 42. Spur gear 32B may be connected to spur gear 44B, which in turn may be connected to spur gear 42B. For example, if spur gear 32B is rotated clockwise relative to the clock face 12, then spur gear 44B would rotate counterclockwise and spur gear 42B would rotate clockwise.

The sixth gear element 50 may connect the elapsed time hour hand 19 of the analog hour indicator 18 to move synchronously with the minute hand 14 and hour hand 16. The sixth gear element 50 may include a shaft 51 connected to the elapsed time hour hand 19 and a large diameter spur gear 50B that has the same pitch diameter as spur gear 36B. Spur gear 50B may be connected to spur gear 36B such that rotation of the first gear element 32 by knob 40 rotates the elapsed time hour hand 19, which corresponds to the movement of the hour hand 14.

Releasing the releasable connection between the elapsed time display 17 and the minute hand 14 and hour hand 16 such that the elapsed time hour hand 19 and elapsed time minute hand 22 may be biased to an initial position may reset the elapsed time display 17. The elapsed time hour hand 19 and elapsed time minute hand 22 may be biased to an initial or zero position by a spring 60. For example, the spring 60 may bias the elapsed time hour hand 19 to the "12 o'clock" position and the elapsed time minute hand 22 to the "60 minute" position as shown in FIG. 1.

The elapsed time hour hand 19 may be reset to an initial position by releasing the releasable connection between the sixth gear element 50 and the third gear element 36. The connection may be released by freeing the teeth of spur gear 50B from meshing engagement with the teeth of spur gear 36B by axial movement of gear element 50, thereby allowing the spring 60 to rotate the gear element 50 and corresponding elapsed time hour hand 19 to the initial position.

Similarly, the elapsed time minute hand 22 may be reset to an initial position by releasing the releasable connection between gear element 42 and gear element 44. The connection may be released by freeing the teeth of spur gear 42B from the teeth of spur gear 44B by axial movement of gear 42, thereby allowing the spring 60 to rotate the fourth gear element 42 and corresponding elapsed time minute hand 22 to the initial position.

A knob and bar assembly may be used to simplify releasing the releasable connections to reset the elapsed time display 17. As shown in FIG. 2, the bar and knob assembly may include two knobs 62, 64, slidably received in slotted sleeves 62B, 64B mounted on the inner face of shell 12A. The assembly may also include two bars 63, 65 that are slidably mounted on studs 63A, 65A and which may be held into position and biased towards the inner face of shell 12A by springs 63C, 65C that are mounted on studs 63D, 65D, respectively. Knob 62 and bar 63 may be aligned such that when knob 62 is depressed against the bias of spring 66, tab 62A thereof urges bar 63 in an axial direction against gear element 42, thereby urging spur gear 42B axially out of engagement with spur gear 44B to release the releasable connection therebetween. Further, knob 64 and bar 65 may be aligned such that when knob 64 is depressed against the bias of spring 67, tab 64A thereof urges bar 65 against gear element 50, thereby urging spur gear 50B axially out of engagement with spur gear 36B to release the releasable connection therebetween.

For convenience, the teacher clock 10 may include a handle assembly 70 to make it easier to carry. Further, a slot 72, shaped to receive the head of a screw or nail, may be provided so that the teaching clock 10 may be hung from a wall or the like. Still further, a stand 74 may be pivotally attached to the back of the teacher clock 10 and retained within a recess 75 to allow the clock 10 to stand on a table or other surface. Additionally, a knob 40 may be directly connected to the first gear element 32 to simplify rotation of the first gear element 32 and corresponding movement of the minute hand 14, hour hand 16 and elapsed time display 17.

Figure 3:
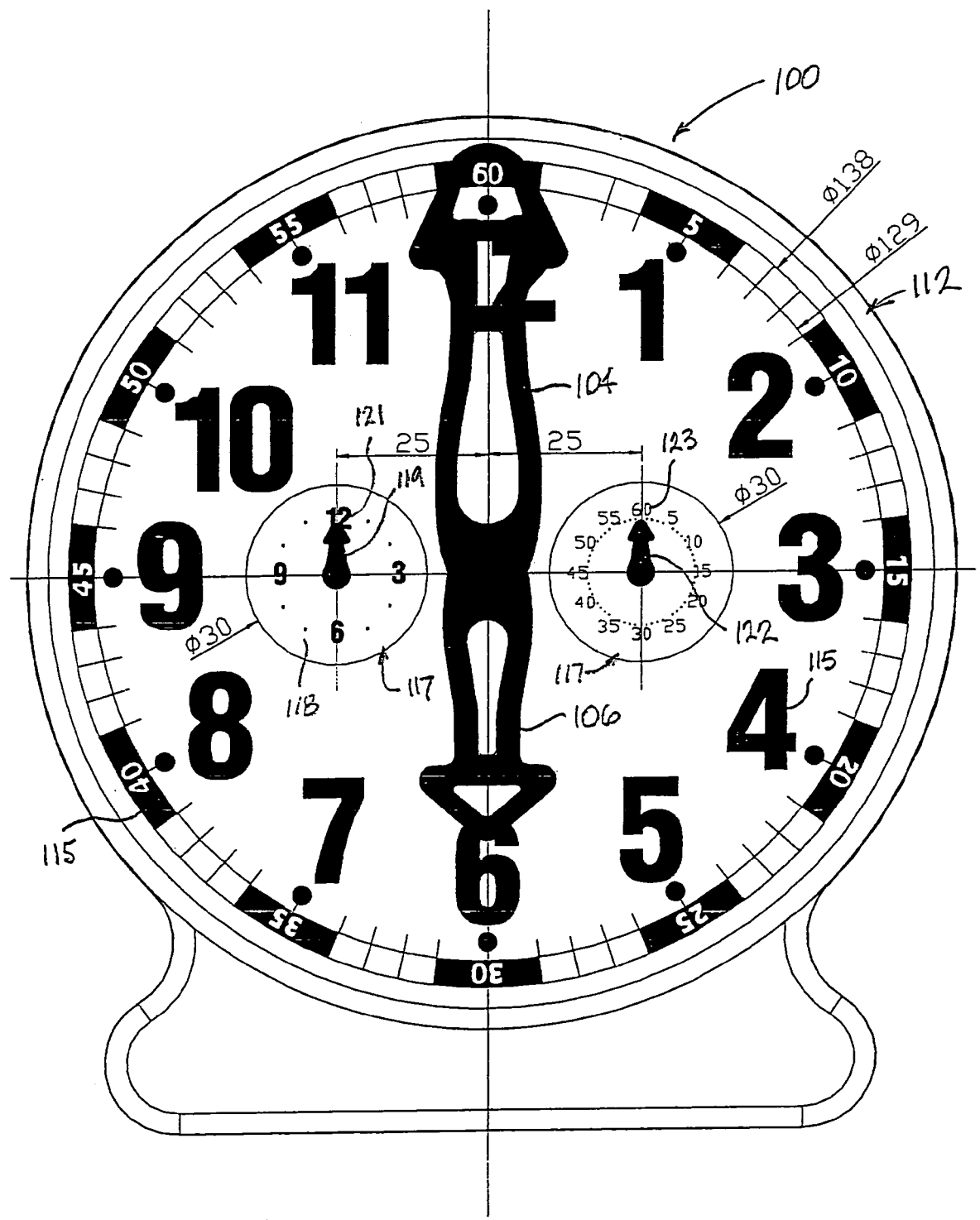
FIG. 3 is a front elevational view of the face of a student clock of the present invention.

As shown in FIG. 3, a student clock, generally designated 100, may include a clock face 112 with inner and outer clock face shells 112A, 112B (see also FIG. 4) with a minute hand 104 and an hour hand 106 pivotally mounted thereto. The hour hand 106 may be connected to the minute hand 104 by a gear train 125 (see FIG. 4) such that movement of the minute hand 104 about the clock face causes synchronous and corresponding movement of the hour hand 106 to designate a time of day.

Various numeric indicia 115 may be displayed around the periphery of the clock face 112. The numbers 1 through 12 may be positioned and equally spaced around the periphery of the clock face 112 to indicate an hour component of the time of day. Furthermore, the indicia 115 may include the numbers 5, 10, 15, 20, 25, 30, 35 40, 45, 50, 55 and 60 positioned around the periphery of the clock face to indicate a minute component of the time of day.

The student clock face 112 may also include an elapsed time display 117 having an analog hour indicator 118 and an analog minute indicator 120 positioned on the clock face. The analog hour indicator 118 may include an elapsed time hour hand 119 pivotally mounted thereto and hour indicating indicia 121 disposed about the periphery of the analog hour indicator 118. The analog minute indicator 120 may include an elapsed time minute hand 122 pivotally mounted thereto and minute indicating indicia disposed about the periphery of the analog minute indicator 120. The elapsed time hour hand 119 may engage detent arm 119A, which may engage detents formed on the inner surface of indicator 118, and tubular knob 119B that extends through the inner shell 112B to facilitate manual rotation of the elapsed time hour hand. Similarly, elapsed time minute hand 122 may engage detent arm 122A, which may engage detents formed on the inner surface of indicator 120, and tubular knob 122B that extends through the inner shell 112B to facilitate manual rotation of the elapsed time minute hand. In contrast to the teacher clock 10 (FIGS. 1,2 and 5), the analog hour indicator 118 and analog minute indicator 120 of the student clock 100 may pivot independently of each other and of the minute hand 104 and hour hand 106. In an alternative aspect, the elapsed time display 117 may be a digital elapsed time display.

Figure 4:
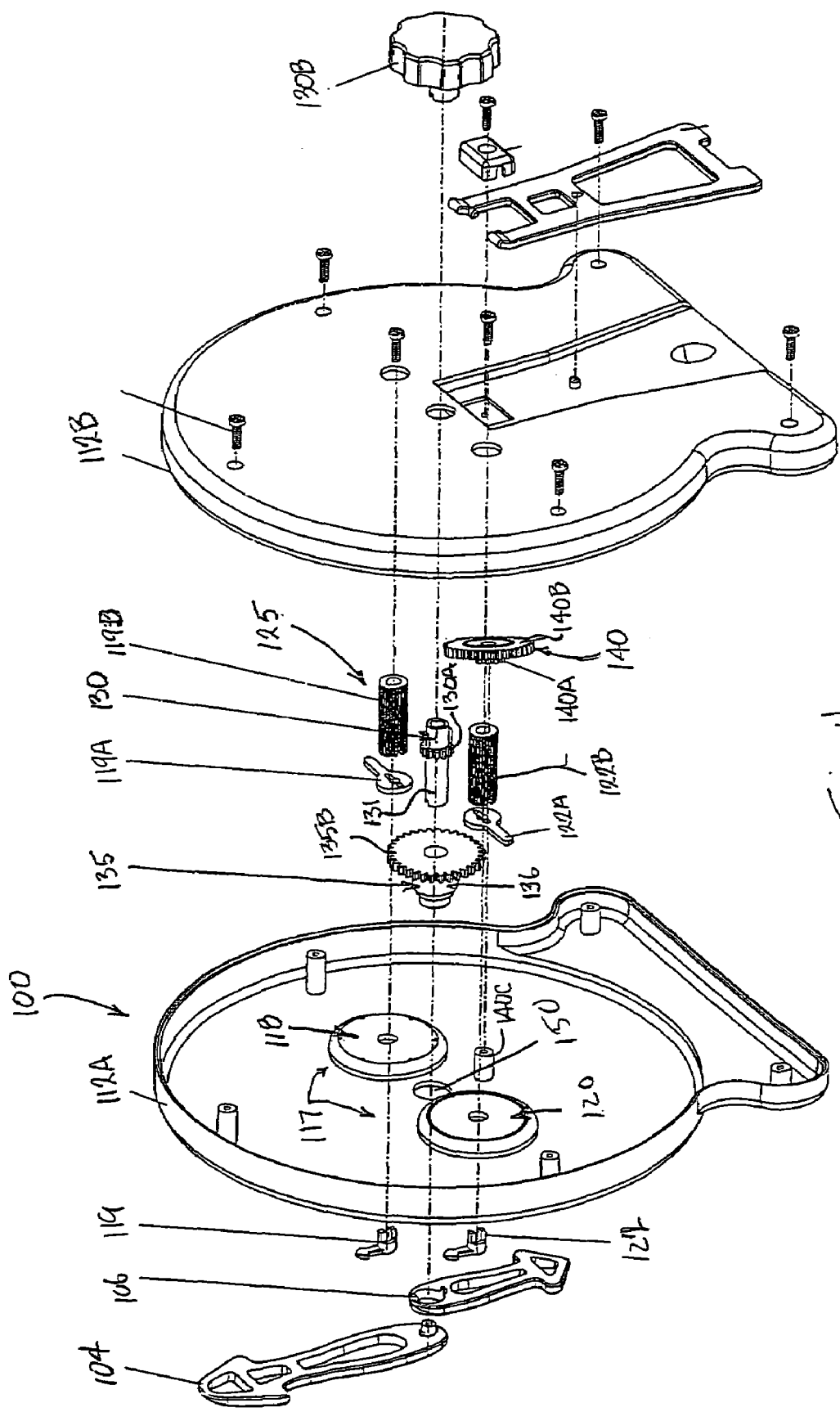
FIG. 4 is an exploded, perspective view of the student clock of FIG. 3.

As shown in FIG. 4, the gear train 125 may be contained between the inner and outer shells 112A, 112B and may include three spur gears that interconnect the minute hand 104 and the hour hand 106. The gear assembly 125 may include a first gear element 130, a second gear element 135 and a third gear element 140.

The first gear element 130 may include a shaft 131 and a small diameter spur gear 130A. The second gear element 135 may include a hollow shaft 136 and one large diameter spur gear 135B. The third gear element 140 may include a small diameter spur gear 140A and a large diameter spur gear 140B. Spur gears 130A and 140A may have the same pitch diameter. Spur gears 135B and 140B may have the same pitch diameter, which may be twelve times larger than that of spur gears 130A and 140A. For example, if spur gears 130A and 140A each were to have a pitch diameter of 5 mm, spur gears 135B and 140B would each have a pitch diameter of 60 mm.

The shaft 131 of the first gear element 130 may be coaxially received within the hollow shaft 136 of the second gear element 135 such that both shafts 131, 136 extend through an opening 150 through the clock face 112. The end of the shaft 131 of the gear element 130 opposite the shell 112A may extend through the inner shell 112B and receives a knob 130B to facilitate manual rotation of the shaft. The minute hand 104 may be connected to the shaft 131 of the first gear element 130 and the hour hand 106 may be connected to the hollow shaft 136 of the second gear element 135. The first gear element 130 may be connected to the second gear element 135 by the third gear element 140, which may be rotatably mounted on post 140C. Spur gear 130A may mesh with spur gear 140B and spur gear 140A may mesh with spur gear 135B. Therefore, one full (i.e., 360°) rotation of the first gear element 130 (as by manual rotation of knob 130B) may correspond to one-twelfth of a rotation (i.e., 30°) of the third gear element 140, which may correspond to one-twelfth of a rotation (i.e., 30°) of the second gear element 135, such that one full rotation of the minute hand 104 about the clock face 112 corresponds to one-twelfth of a rotation of the hour hand 106 about the clock face.

Figure 5:
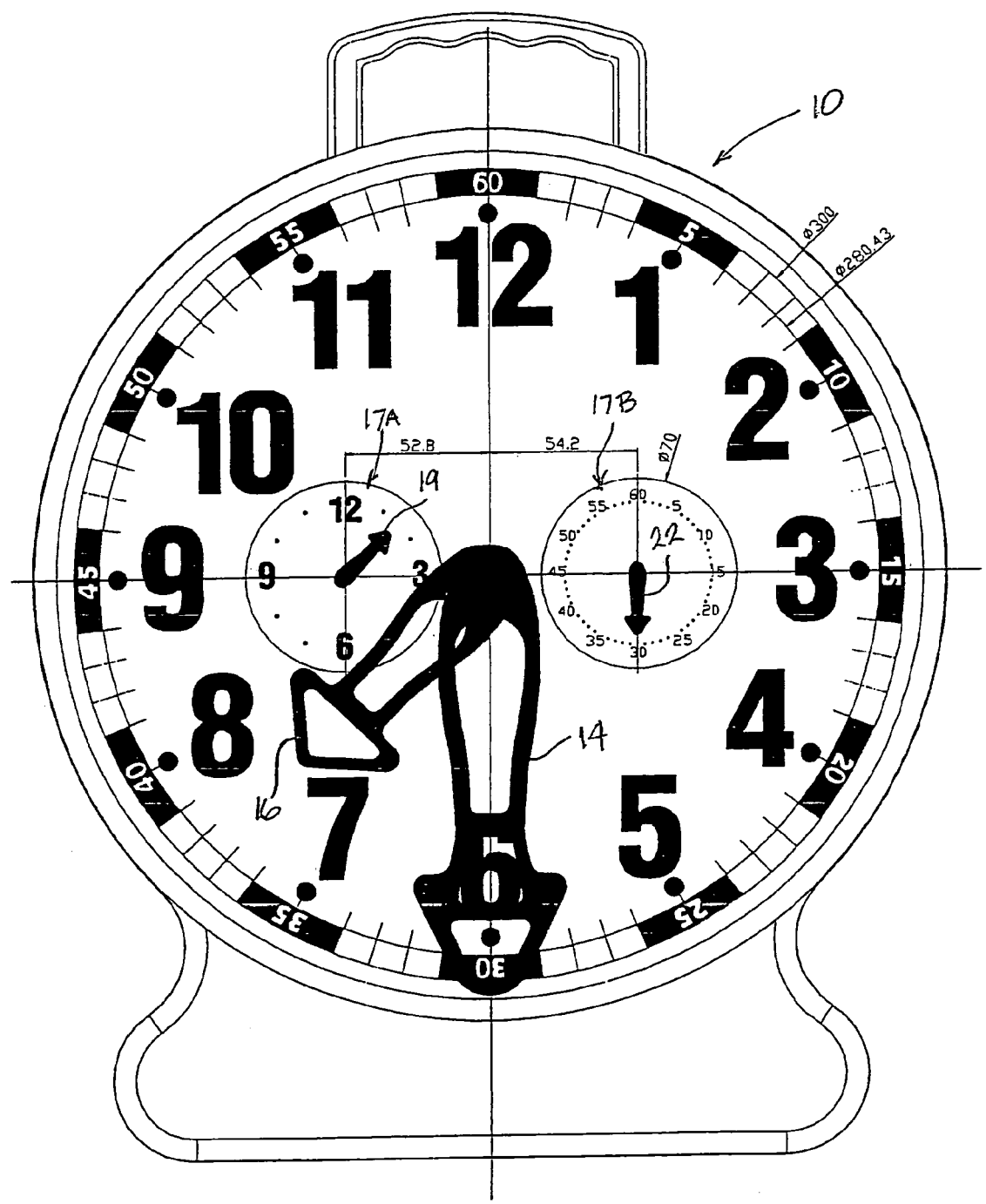
FIG. 5 is a front elevational view of the face of the teacher clock of FIG. 1 displaying a second selected time of day and the correct elapsed time from the time shown on the face in FIG. 1.
Figure 7:
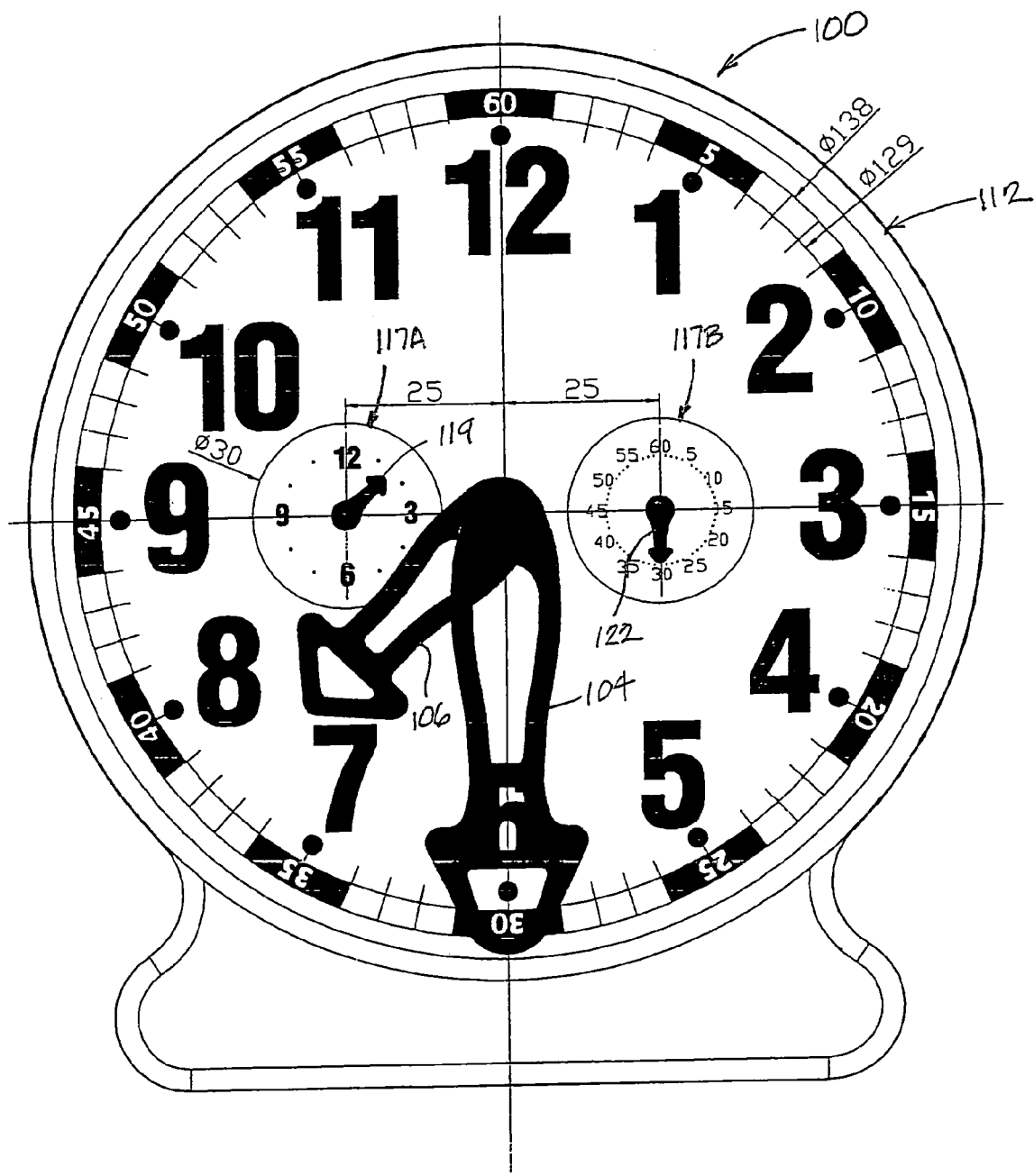
FIG. 7 is a front elevational view of the face of the student clock of FIG. 3 displaying a second selected time of day and the elapsed time from the time shown on the face in FIG. 3.

Thus, the concepts of elapsed time, beginning time and ending time may be taught using both the teacher clock 10 and the student clock 100, or alternatively, only the teacher clock. As shown in FIG. 1, to teach the concept of elapsed time, the minute hand 14 and hour hand 16 of the teacher clock 10 may first be set to an initial time of day (for example, 6:00, as shown in FIG. 1) and the elapsed time display 17A, 17B zeroed in the manner described above. The minute hand 104 and hour hand 106 of the student clock 100 may be set to a second time of day (for example, 7:30, as shown in FIG. 7). The student may then be asked to determine the amount of time that has elapsed between the first time of day (i.e., 6:30) shown on the teacher clock 10 and the second time of day (i.e., 7:30) shown on the student clock 100. Once the student has determined the elapsed time (i.e., 1 hour and 30 minutes), the student may manually display the determined elapsed time using the elapsed time display 117A, 117B of the student clock 100 by pivoting the elapsed time hour hand 119 to display 1 hour and the elapsed time minute hand 122 to display 30 minutes. Alternatively, the student may write down or state the elapsed time. As shown in FIG. 5, to verify that the student has determined the correct elapsed time, the teacher may move the minute hand 14 and hour hand 16 clockwise to the second time of day (i.e., 7:30), wherein the elapsed time display 17A, 17B would display the correct elapsed time (i.e., 1 hour and 30 minutes) automatically.

Similarly, the concept of ending time may be taught by positioning the hands 14, 16 of the teacher clock 10 at a selected beginning time, for example, 6:00, as shown in FIG. 1. The elapsed time display 17A, 17B may be zeroed and the student may be asked to show on the student clock 100 (or, alternatively, to write down or to state verbally) the ending time for a given elapsed time, for example 1 hour and 30 minutes. As shown in FIG. 7, the student may position the hands 104, 106 of the student clock 100 to 7:30. Optionally, the student may also position the hands 119, 122 of the elapsed time display 117A, 117B to show the desired elapsed time, either before determining the ending time or afterward. As shown in FIG. 5, in order to verify the student's answer, the hands 14, 16 of the teacher clock 10 may then be moved clockwise until the hands 19, 22 of the elapsed time display 17A, 17B show the desired elapsed time (1 hour and 30 minutes). The ending time (7:30) may then be indicated automatically by the hands 14, 16 of the teacher clock 10.

Figure 6:
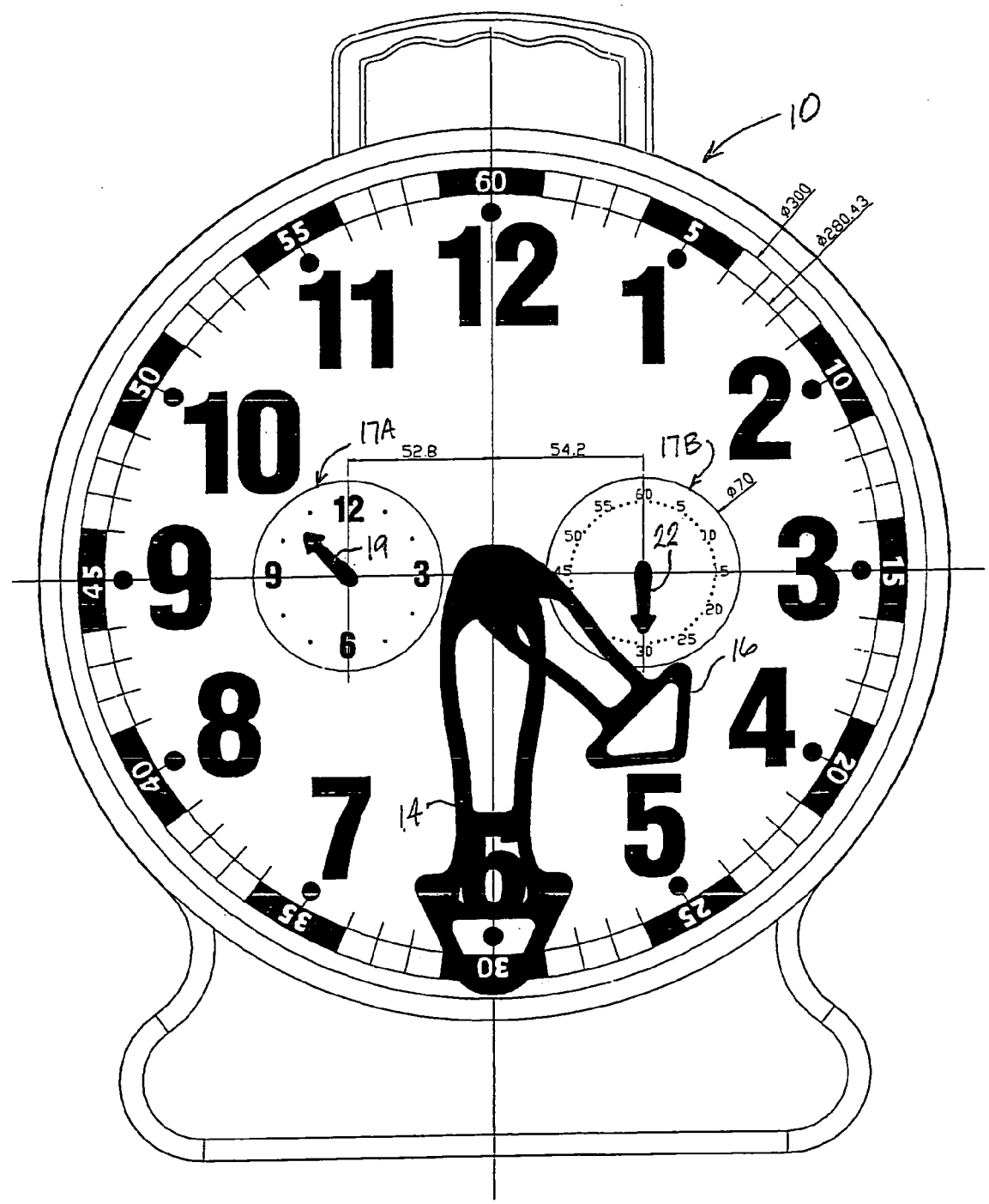
FIG. 6 is a front elevational view of the face of the teacher clock of FIG. 1 displaying a third selected time of day and the correct elapsed time from the time shown on the face in FIG. 1.
Figure 8:
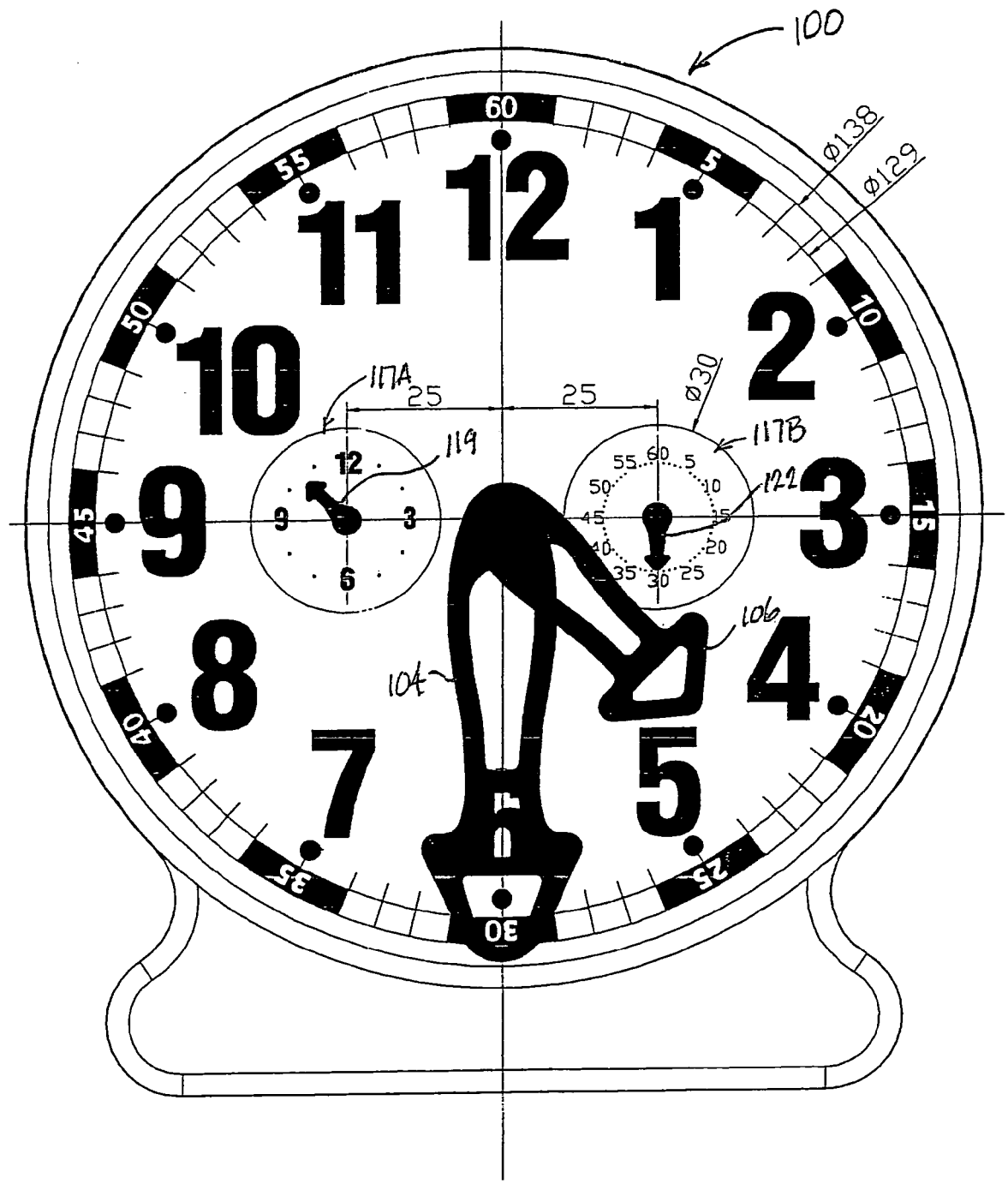
FIG. 8 is a front elevational view of the face of the student clock of FIG. 3 displaying a third selected time of day and the elapsed time from the time shown on the face in FIG. 3.

The concept of beginning time may be taught by positioning the hands 14, 16 of the teacher clock 10 at a predetermined ending time of day, for example 6:00 as shown in FIG. 1, and zeroing the elapsed time display 17A, 17B. The student may then be asked to show on the student clock 100 (or, alternatively, to write down or to say verbally) the beginning time from which a given elapsed time, for example 1 hour and 30 minutes, would result in the ending time of 6:00. As shown in FIG. 8, the student would respond by setting the hands 104, 105 of the student clock 100 at the correct beginning time (4:30) from which the desired elapsed time of 1 hour and 30 minutes would result in the desired ending time of 6:00. Optionally, the student may also set the hands 119, 122 to indicate the given elapsed time. As shown in FIG. 6, to verify the student's answer, the hands 14, 16 of the teacher clock 10 may then be moved counter-clockwise until the hands 19, 22 of the elapsed time display 17A, 17B show the desired elapsed time of 1 hour and 30 minutes (measured counterclockwise from the "12" and "60" positions, respectively). The hands 14, 16 will, at that point, automatically indicate the correct beginning time of 4:30.

Although various aspects of the disclosed apparatus, method and system for teaching elapsed time have been shown and described, modifications may occur to those skilled in the art upon reading the specification. The present application includes such modifications and is limited only by the scope of the claims.

What is claimed is:

1. A system for teaching elapsed time comprising:
   a teacher clock including:
      a clock face;
      a minute hand pivotally mounted to said clock face;
      an hour hand pivotally mounted to said clock face and connected to said minute hand such that pivotal movement of said minute hand about said clock face causes said hour hand to pivot synchronously therewith to designate a progression of hours, whereby said minute hand and said hour hand are selectively positionable to display a time of day; and
      an elapsed time display having a releasable connection connected to said minute hand, such that said elapsed time display resets to an initial position upon release of said releasable connection, whereby an elapsed time is shown by said elapsed time display as a result of movement of said minute hand and said hour hand between any two selected times of day on said clock face;
   a student clock including:
      a clock face;
      a minute hand pivotally mounted to said clock face;
      an hour hand pivotally mounted to said clock face and connected to said minute hand such that pivotal movement of said minute hand about said clock face causes said hour hand to pivot synchronously therewith to designate a progression of hours, whereby said minute hand and said hour hand are selectively positionable to display a time of day; and
      an elapsed time display adjustable independently of said student clock minute hand;
   wherein said minute hand and said hour hand of said teacher clock are adjusted to show a first selected time of day and said elapsed time display is reset, and said minute hand and said hour hand of said student clock are adjusted to show a second selected time of day, such that a student may determine an elapsed time between said first selected time of day and said second selected time of day and display said determined elapsed time on said elapsed time display on said student clock; and
   wherein a verification elapsed time is obtained by adjusting said minute hand and said hour hand on said teacher clock to correspond with said second selected time of day such that said elapsed time display on said teacher clock displays said verification elapsed time.

2. The system of claim 1 wherein said clock face of said teacher clock includes numeric indicia positioned along a periphery of said clock face.

3. The system of claim 1 wherein said elapsed time display of said teacher clock includes an analog minute display and an analog hour display.

4. The system of claim 1 wherein said elapsed time display of said teacher clock includes a face displaying hours and a face displaying minutes.

5. The system of claim 1 wherein said clock face of said student clock includes numeric indicia positioned along a periphery of said clock face.

6. The system of claim 1 wherein said elapsed time display of said student clock includes an analog minute display and an analog hour display.

7. The system of claim 1 wherein said elapsed time display of said student clock includes a digital minute display and a digital hour display.

8. A method for teaching the concept of ending time to a student comprising the steps of: providing a teacher clock including: a clock face; a minute hand pivotally mounted to said clock face; an hour hand pivotally mounted to said clock face and connected to said minute hand such that pivotal movement of said minute hand about said clock face causes said hour hand to pivot synchronously therewith to designate a progression of hours, whereby said minute hand and said hour hand are selectively positionable to display a time of day; and an elapsed time display having a releasable connection connected to said minute hand, such that said elapsed time display resets to an initial position upon release of said releasable connection, whereby an elapsed time is shown by said elapsed time display as a result of movement of said minute hand and said hour hand between any two selected times of day on said clock face; pivoting said minute hand clockwise about said clock face to position said minute hand and said hour hand to display a selected beginning time of day; actuating said releasable connection such that said elapsed time display resets to an initial position corresponding to said beginning time of day; selecting a desired elapsed time; asking a student to calculate an ending time resulting from said desired elapsed time added to said beginning time of day; verifying a result reached by said student by pivoting said minute hand and said hour hand from said beginning time of day to an ending time of day at which said elapsed time display has moved from said initial position to indicate said desired elapsed time; and comparing said ending time of day with said calculated ending time.

9. The method of claim 8 wherein said asking step includes the step of asking said student to display said calculated ending time on a student clock.

10. A method for teaching the concept of ending time to a student comprising the steps of: providing a teacher clock including: a clock face; a minute hand pivotally mounted to said clock face; an hour hand pivotally mounted to said clock face and connected to said minute hand such that pivotal movement of said minute hand about said clock face causes said hour hand to pivot synchronously therewith to designate a progression of hours, whereby said minute hand and said hour hand are selectively positionable to display a time of day; and an elapsed time display having a releasable connection connected to said minute hand, such that said elapsed time display resets to an initial position upon release of said releasable connection, whereby an elapsed time is shown by said elapsed time display as a result of movement of said minute hand and said hour hand between any two selected times of day on said clock face; pivoting said minute hand clockwise about said clock face to position said minute hand and said hour hand to display a selected beginning time of day; actuating said releasable connection such that said elapsed time display resets to an initial position corresponding to said beginning time of day; selecting a desired ending time of day; asking a student to calculate an elapsed time between said beginning time of day and said ending time of day; verifying a result reached by said student by pivoting said minute hand and said hour hand from said beginning time of day to said ending time of day at which said elapsed time display has moved from said initial position to indicate said elapsed time; and comparing said indicated elapsed time with said calculated elapsed time.

11. The method of claim 10 wherein said asking step includes the step of asking said student to display said calculated elapsed time on an elapsed time display of a student clock.

\* \* \* \* \*